March 9, 1948. R. R. REDDICK 2,437,652
WELDING ROD HOLDER
Filed Nov. 21, 1945
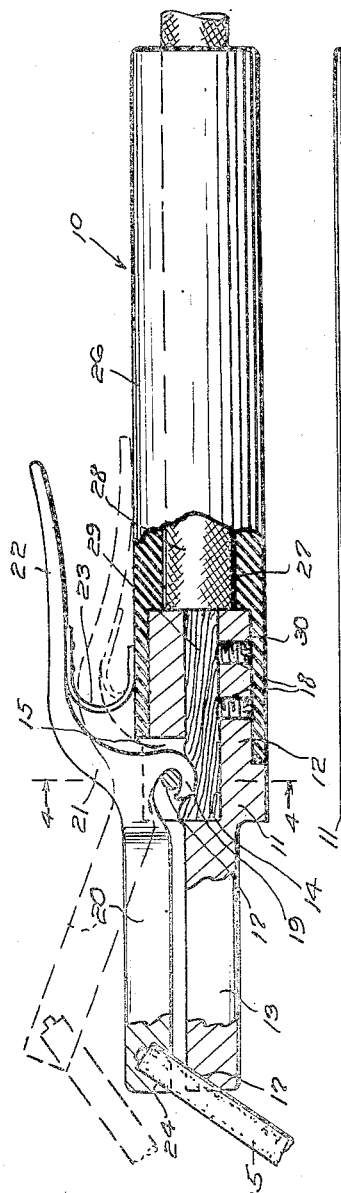
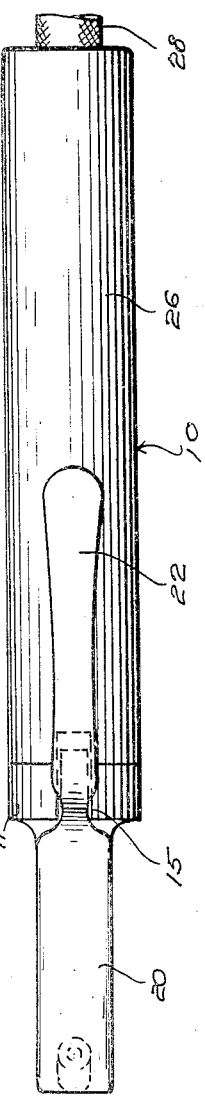
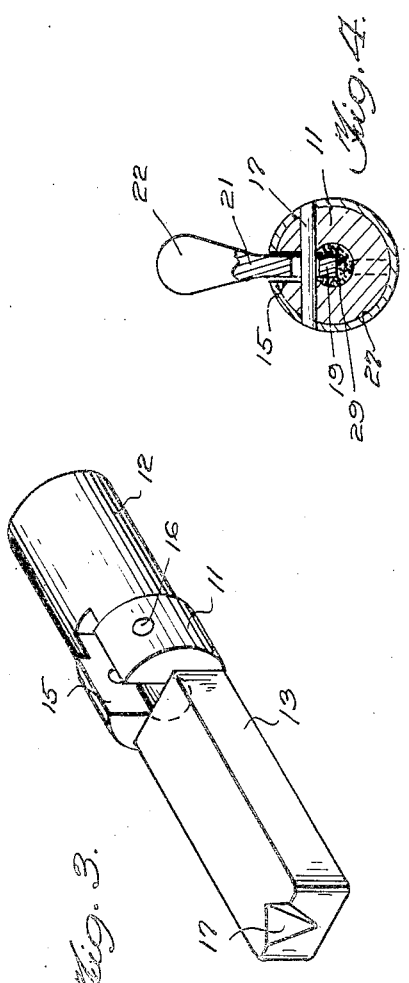
Inventor
Rupert R. Reddick,
By Clarence A. O'Brien
and Harvey B. Jacobson
Attorneys Patented Mar. 9, 1948

2,437,652

UNITED STATES PATENT OFFICE 2,437,652

WELDING ROD HOLDER

Rupert R. Reddick, Oakland, Calif.

Application November 21, 1945, Serial No. 629,937

1 Claim. (Cl. 219—8)

This invention relates to a welding rod holder such as is commonly employed in electric welding.

In the art of electric welding, it is customary to use as one electrode what is commonly known in the art as a welding rod. Such items comprise an elongated body of a suitable composition, usually of metal, which is frequently encased in a coating of flux. One of the major problems in the handling of such a rod is properly to hold it for manipulation by the welder and at the same time procure good electrical contact with a conductor supplying the current for effecting the weld.

The primary object of the present invention is to support a welding rod for manipulation in a welding operation and at the same time assure good, electrical contact of the welding rod with the cable or conductor conveying the electric power thereto.

Another object of the invention is to facilitate the rapid interchange of a used welding rod for a new welding rod, as the rods become shortened through use.

A still further object of the invention is to so hold the welding rod that substantially its entire length is usable for welding purposes.

The above and other objects may be attained by employing this invention which embodies, among its features, a stationary jaw having an inclined socket in one end in which a welding rod is adapted to seat, a movable jaw having a socket adjacent one end arranged in axial alignment with the axis of the notch in the stationary jaw, which notch is adapted to receive the end of the welding rod, and yielding means to urge the movable jaw toward the stationary jaw firmly to clamp the welding rod in place in such a manner that it may be utilized substantially throughout its entire length.

Other features include so clamping the rod against the stationary jaw as to effect good, electrical contact, and to establish good electrical contact between the stationary jaw and the conductor cable through which power is supplied to the welding rod.

In the drawings—

Figure 1 is a side view of a welding rod or electrode holder embodying the features of this invention, certain portions being shown in section to more clearly illustrate the details thereof, Figure 2 is a top plan view of Figure 1 showing the welding rod omitted, Figure 3 is a perspective view of the stationary jaw and the ferrule associated therewith, and Figure 4 is a transverse sectional view taken substantially on the line 4—4 of Figure 1.

Referring to the drawings in detail, my welding rod holder, designated generally 10, comprises a ferrule 11 formed at one end with a reduced cylindrical body 12 and at its opposite end with a longitudinally projecting stationary jaw 13. The reduced portion 12 and the jaw 13 are formed as integral parts of the ferrule 11 and the ferrule and the extension 12 are provided with a longitudinally extending, internal bore 14, the purpose of which will be more fully hereinafter explained. Opening into the ferrule from one side and communicating with the bore 14 is a longitudinal slot 15 which extends partially into the reduced cylindrical portion 12, as will be readily seen upon reference to Figure 3. Extending transversely through the ferrule and substantially midway between the top and bottom edges of the side walls of the slot 15 is a bore 16 for the reception of a pivot pin 17 by which the movable jaw, to be more fully hereinafter described, is pivotally connected to the ferrule. Formed in the forward end of the fixed jaw 13 is an inclined V-shaped groove 17 in which a welding rod is removably secured, as will be more fully hereinafter explained. As illustrated in Figure 1, the cylindrical extension 12 is provided with radially extending, internally screw-threaded openings 18, the purpose of which will be more fully hereinafter described.

Detachably connected, as by hook 19 to the pivot pin 17, is a movable jaw 20 and rising substantially perpendicularly from the movable jaw is a lever 21 which terminates in an angularly extending hand grip 22 which, when the parts are assembled, extends in a direction opposite the jaw 20 and substantially parallel to the extension 12 of the ferrule 11. A leaf spring 23 is secured to the handle 22 and the opposite end thereof is formed in a return bend so as to lie in a plane substantially parallel with the axis of the ferrule 11. Formed in the movable jaw 20 near its free end is a welding rod receiving socket 24 which, when the jaws are closed or in parallel relation, as illustrated in Figure 1, lies in such a position that its longitudinal axis aligns substantially with the longitudinal axis of the inclined notch 17 to cooperate therewith in holding an electrode or welding rod 25 in place in the holder.

A sleeve 26 having an enlarged bore 27 adjacent one end is adapted to be slipped over the extension 12 of the ferrule 11 to form a handle by which the welding rod holder and the welding rod may be manipulated. This sleeve 26 is preferably formed of a suitable insulating material and extending longitudinally through the sleeve is a cable 28 enclosing a conductor 29 by which power is conveyed to the ferrule 11. As illustrated in Figure 1, the conductor 29 is bared for a limited distance from its end and enters the bore 14 in the ferrule 11, whereupon suitable set-screws 30 are introduced into the threaded bores 18 so as to bear against the bared portion 29 of the cable 28 and effect good electrical contact between the conductor and the ferrule. As illustrated in Figure 1, the extreme end of the conductor 29 abuts the end of the fixed jaw 13 opposite that carrying the notch 17 and the hook 19 bears against the conductor 29 so as to further improve the contact established between the conductor and the jaws of the welding rod holder.

In use, it will be understood that the handle 22 is depressed toward the handle 26, as suggested by the dotted lines in Figure 1, at which time a welding rod may be introduced into the socket 24 and upon releasing the pressure on the handle 22 the jaw 20 will be advanced toward the jaw 13 under the influence of the spring 23. The welding rod will be seated in the notch 17 and good electrical contact between the jaws 13 and 20 and the welding rod will thus be effected. It is obvious that as the welding rod becomes too short for further use, a new one may readily be inserted by simply depressing the handle 22 to permit the stub to fall out of the socket 24 so that a new welding rod may be inserted therein, and such interchange may take effect with great rapidity. Due to the pressure of the screws 30 on the conductor 29 within the bore 14, good electrical connection will be established between the conductor and the ferrule, thus insuring full delivery of power to the welding rod and at the same time avoiding the heating of the handle 26 through the heating effects of poor connections. Should it be found desirable to use welding rods of different sizes, it is obvious that by a simple movement of the hook 19 the movable jaw 20 may be quickly detached and one with a larger socket or a smaller socket 24 substituted. It will thus be seen that the utility of the device is practically unlimited.

While in the foregoing there has been shown and described the preferred embodiment of this invention, it is to be understood that minor changes in the details of construction and combination and arrangement of parts may be resorted to without departing from the spirit and scope of the invention as claimed.

Having thus described the invention, what I claim as new is:

A welding rod holder comprising a ferrule having a conductor receiving axial bore entering one end, an integral fixed jaw protruding axially from the opposite end of the ferrule, said ferrule also having a radial slot opening into the bore adjacent its junction with the fixed jaw, a pivot pin extending transversely through the ferrule substantially midway between the ends of the slot, said fixed jaw having an inclined notch in its end remote from the ferrule, a movable jaw having an inclined welding rod-receiving socket near one end adapted to align axially with the notch in the end of the fixed jaw when the jaws are parallel, an integral offset handle at the end of the movable jaw remote from the socket, a hook on the movable jaw at its junction with its integral handle, said hook engaging the pivot pin pivotally to couple the movable jaw with the fixed jaw, a tubular handle fitted over the ferrule, a spring carried by the tubular handle and engaging the handle on the movable jaw yieldingly to urge the movable jaw toward the fixed jaw and a conductor entering the bore in the ferrule and so clamped therein as to contact the hook on the movable jaw and effect good electrical contact therewith.

RUPERT R. REDDICK.

REFERENCES CITED

The following references are of record in the file of this patent:

UNITED STATES PATENTS

| Number | Name | Date |
|---|---|---|
| 1,345,817 | Williams | July 6, 1920 |
| 1,552,244 | Thomas | Sept. 1, 1925 |
| 1,989,901 | Villars | Feb. 5, 1935 |
| 2,327,290 | Rice | Aug. 17, 1943 |
| 2,347,598 | Foley et al. | Apr. 25, 1944 |
| 2,389,559 | Smith | Nov. 20, 1945 |

FOREIGN PATENTS

| Number | Country | Date |
|---|---|---|
| 208,218 | Switzerland | Apr. 1, 1940 |
| 404,601 | Germany | Oct. 20, 1924 |